(12) United States Patent
Mosteller

(10) Patent No.: US 10,783,337 B2
(45) Date of Patent: Sep. 22, 2020

(54) IC CHIP CARD

(71) Applicant: CPI CARD GROUP—COLORADO, INC., Littleton, CO (US)

(72) Inventor: Barry Mosteller, Castle Pines, CO (US)

(73) Assignee: CPI Card Group—Colorado, Inc., Littleton, CO (US)

( * ) Notice: Subject to any disclaimer, the term of this patent is extended or adjusted under 35 U.S.C. 154(b) by 0 days.

(21) Appl. No.: 15/746,063

(22) PCT Filed: Aug. 16, 2017

(86) PCT No.: PCT/US2017/047206
§ 371 (c)(1),
(2) Date: Jan. 19, 2018

(87) PCT Pub. No.: WO2018/035258
PCT Pub. Date: Feb. 22, 2018

(65) Prior Publication Data
US 2019/0340398 A1    Nov. 7, 2019

Related U.S. Application Data

(60) Provisional application No. 62/375,812, filed on Aug. 16, 2016.

(51) Int. Cl.
*G06K 7/10* (2006.01)
*G06F 21/32* (2013.01)

(52) U.S. Cl.
CPC ......... *G06K 7/10366* (2013.01); *G06F 21/32* (2013.01)

(58) Field of Classification Search
CPC ............................ G06K 7/10366; G06F 21/32
See application file for complete search history.

(56) References Cited

U.S. PATENT DOCUMENTS

| 3,374,530 A | 3/1968 | Flanders et al. |
| 5,179,950 A | 1/1993 | Stanislaw |
| 6,325,285 B1 | 12/2001 | Baratelli |

(Continued)

FOREIGN PATENT DOCUMENTS

| EP | 2073154 A1 | 6/2009 |
| WO | 2015007762 A1 | 1/2015 |

*Primary Examiner* — Seung H Lee
(74) *Attorney, Agent, or Firm* — Dorsey & Whitney LLP

(57) ABSTRACT

An integrated circuit (IC) chip card includes a card body and an integrated IC chip module located in a recess provided by the card body on one side thereof. The IC chip module includes a substrate having outward-facing and inward-facing surfaces, and a first plurality of contact pads supportably interconnected to the outward-facing surface of the substrate. The IC chip module further includes a first IC chip supportably interconnected to the inward-facing surface of the substrate and electrically interconnected to the first plurality of contact pads for processing a signal received therefrom. The IC chip module may also include a second plurality of contact pads supportably interconnected to the outward-facing surface of the substrate. The IC chip module may further include conductive protrusions supportably connected to the inward-facing surface and having protruding ends that extend in to a thickness of corresponding embedded conductive contacts of the card body.

36 Claims, 8 Drawing Sheets

(56) References Cited

U.S. PATENT DOCUMENTS

| | | | |
|---|---|---|---|
| 6,378,774 B1 | 4/2002 | Emori et al. | |
| 7,558,965 B2 | 7/2009 | Wheeler et al. | |
| 7,689,833 B2 | 3/2010 | Lange | |
| 8,100,337 B2 | 1/2012 | Artigue et al. | |
| 8,317,108 B2 | 11/2012 | Patrice | |
| 8,594,730 B2 | 11/2013 | Bona et al. | |
| 8,994,498 B2 | 3/2015 | Agrafioti et al. | |
| 9,189,901 B2 | 11/2015 | Agrafioti et al. | |
| 10,089,568 B2 * | 10/2018 | Mosteller | G06K 7/10297 |
| 2005/0150947 A1 | 7/2005 | Goodman et al. | |
| 2005/0212690 A1 | 9/2005 | Nishikawa | |
| 2008/0245879 A1 | 10/2008 | Artigue et al. | |
| 2009/0128338 A1 | 5/2009 | Arai et al. | |
| 2009/0321519 A1 | 12/2009 | Tran | |
| 2011/0047036 A1 | 2/2011 | Foran-Owens et al. | |
| 2015/0049925 A1 | 1/2015 | Lowe | |
| 2015/0116086 A1 | 4/2015 | Kim et al. | |
| 2016/0155039 A1 | 6/2016 | Neymann et al. | |

* cited by examiner

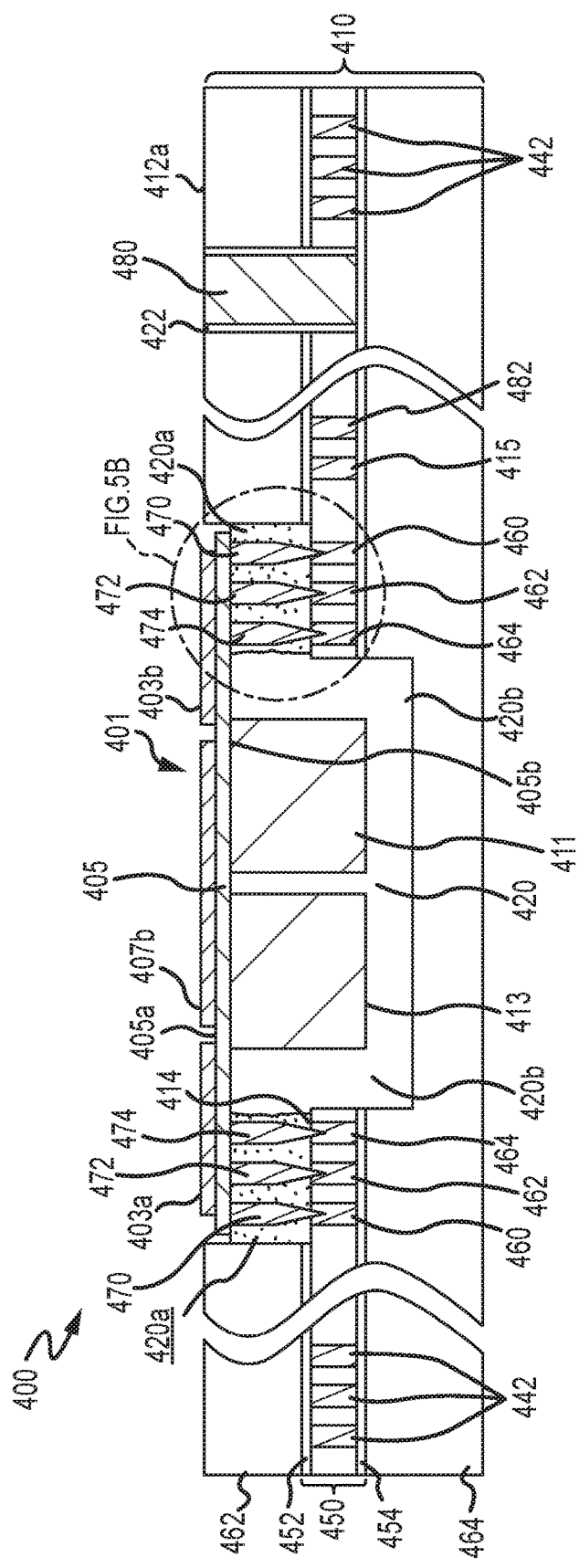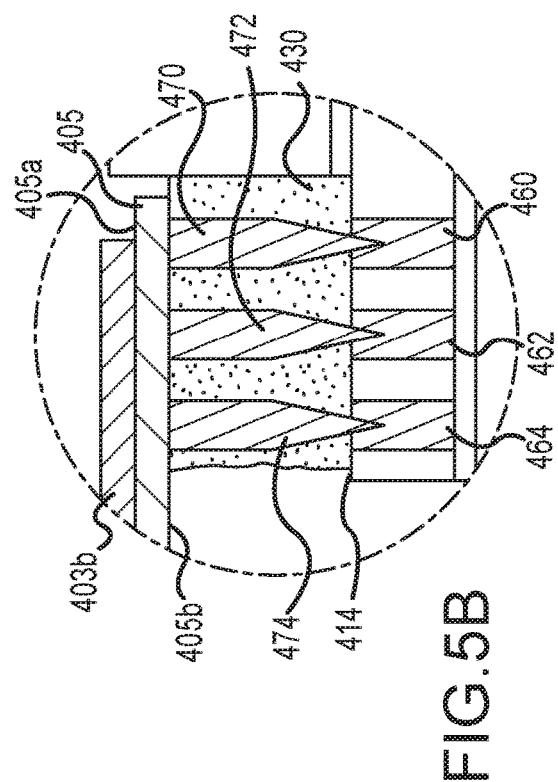

IC CHIP CARD

RELATED APPLICATIONS

This application claims benefit of priority to U.S. Provisional Patent Application No. 62/375,812, filed Aug. 16, 2016, entitled "IMPROVED IC CHIP CARD", and all of said application is incorporated herein by reference in its entirety.

BACKGROUND

Integrated circuit (IC) chip cards are increasingly utilized as payment cards (e.g. credit cards, debit cards, store-value cards, etc.). In that regard, card issuer payment institutions issue chip cards that each have a corresponding specific payment account administered by or on behalf of the card issuer. For example, banks issue chip cards to customers having payment accounts administered by the banks.

With the increased use of payment chip cards, attendant security risks continue to escalate. Such security concerns exist in relation to fraudulent use of lost and stolen payment chip cards, and in relation to the wrongful obtainment of proprietary payment account-related data transmitted between a payment chip card and chip card reader during use of the payment chip card. In the later regard, wrongfully obtained, proprietary payment account-related data may be utilized in fraudulent transactions that involve charges to a payment account without use of an associated payment chip card (e.g. on-line payment transactions).

To address such security concerns, numerous data encryption solutions and elaborate IC chip designs have been proposed. Further, recent efforts have explored the viability of utilizing biometric data to authenticate a user of given a payment chip card as being the issuee to whom the payment chip card has been issued for exclusive use by a payment institution. Such efforts, as well as other prospective card functionalities, often entail embedding electrical components in IC chip cards. To date, such efforts have not resulted in practical and reliable solutions that may be readily implemented in a cost effective manner by the payment card industry.

SUMMARY

In one embodiment, a chip card is disclosed that includes a card body and an integrated circuit (IC) chip module located in a recess provided by the card body on one side of the chip card. The integrated IC chip module may include a substrate (e.g. an electrically non-conductive substrate) having an outward-facing surface and an inward-facing surface, and a first plurality of contact pads (e.g. electrically conductive/isolated pads) supportably interconnected to the outward-facing surface of the substrate for contact engagement with at least one appendage of a user. In that regard, the first plurality of contact pads may be advantageously provided to function as integrated biometric sensor pads. Further, the integrated IC chip module may include a first IC chip supportably interconnected to the inward-facing surface of the substrate and electrically interconnected to the first plurality of contact pads for processing a biometric signal received therefrom.

As will be described further hereinbelow, the disclosed chip card may be provided with additional features to function as a contact or dual contact and contactless payment chip card, e.g. in compliance with ISO/IEC Standards 7816-2 and 14443 hereby incorporated by reference. In turn, processing of the biometric signal may be completed by the first IC chip to authenticate a user and thereby "unlock" the chip card for transactional use.

The provision of an integrated IC module, having a substrate that supports contact pads for providing and an IC chip for processing a biometric signal on opposite sides of the substrate, facilitates chip card production and customization. For example, during chip card production the integrated IC chip module may be readily handled and positioned as a single unit. Additionally, the specific IC chip and layout of contact pads utilized in a given chip card may be readily customized by a given customer with minimal or no required variation of the card body utilized. Further, such approach provides an IC chip module that may be implemented in a chip card in a compact manner, and that otherwise facilitates chip card compliance with various industry standards. For example, in contemplated embodiments, the chip card may be provided as an ID-1 sized card and otherwise compliant with ISO/IEC Standard 7810, hereby incorporated by reference.

In some implementations, the first plurality of contact pads may provide a biometric signal comprising at least one of an electrocardiogram (ECG) signal and a fingerprint signal (e.g. a signal indicative of an individual's electrical heart activity and/or fingerprint). In that regard, the first IC chip may comprise a processor for processing the biometric signal in relation to a corresponding predetermined biometric signature stored in memory of the first IC chip, utilizing preprogrammed instructions/algorithms stored in the memory. As may be appreciated, the predetermined biometric signature may be unique to an individual to whom the chip card has been issued for exclusive use (e.g. use to make payments against a payment account administered by or on behalf of a payment institution issuer of the chip card). Such processing may be conducted to authenticate a user as being the authorized issuee of the chip card, wherein upon such authentication, the first IC chip may enable, or unlock, the chip card for use with a chip card reader (e.g. a contact and/or contactless chip card reader device located at a point-of-sale and operable to transmit/receive communication signals to/from a chip card).

In ECG implementations, the first plurality of contact pads may include first and second pads that are spaced by at least a predetermined distance for separate engagement with first and second appendages of a user to provide an electrocardiogram signal to the first IC chip for processing. By way of example, the predetermined distance may be established to facilitate separate engagement with different fingers of the same hand or of different hands of a card user, wherein a predetermined range of finger and/or hand sizes may be accommodated.

In some embodiments, to facilitate electrical interconnection of the first plurality of contact pads and the first IC chip, each of the contact pads may be electrically interconnected through the substrate to a corresponding electrically conductive contact that may be supportably interconnected to the inward-facing side of the substrate and electrically interconnected to the first IC chip. For example, the contacts corresponding with the first plurality of contact pads may be interconnected to the first IC chip via conductive traces/pads supportably interconnected to the inward-facing side of the substrate or via wire bonding.

In contemplated embodiments, a chip card may further include a second plurality of contact pads (e.g. electrically conductive/isolated pads) supportably interconnected to the outward-facing surface of the substrate for selective electrical contact communication with a contact chip card reader (e.g. via contact with electrically conductive pins of the contact chip card reader). In that regard, the second plurality of contact pads may be electrically interconnected to the first IC chip and/or another IC chip supportably interconnected to the inward-facing surface of the substrate, wherein the IC chip comprises a processor for processing payment-related contact communication signals to/from a contact card reader utilizing preprogrammed instructions/algorithms and personalization data (e.g. payment account identification data corresponding with a specific payment account administered by an issuer of the corresponding chip card) stored in memory thereof, e.g. in compliance with ISO/IEC Standard 7816-2.

In some implementations, the second plurality of contact pads may be located for contact communication with a contact chip card reader in compliance with ISO/IEC Standard 7816-2. In that regard, the second plurality of contact pads may be provided to receive electrical signals from a contact chip card reader that comprise both data communication signal and power signal components (e.g. a data communication signal component imposed on a power signal component), wherein the power signal component may power chip card componentry.

In some arrangements, the second plurality of contact pads may be located within a predetermined area within the recess on one side of the chip card. Further, the first plurality of contact pads may be located outside of and adjacent to the predetermined area within the same recess on said one side of the chip card. In such arrangements, the first plurality of contact pads may include first and second pads that are spaced by at least a predetermined distance that is greater than a distance between any two of the second plurality of contact pads.

In some embodiments, the first plurality of contact pads and second plurality of contact pads may be collectively, or combinatively, located in compliance with ISO/IEC Standard 7816-2. For example, the first plurality of contact pads may comprise two contact pads designated as being auxiliary, or nonessential, pads in ISO/IEC Standard 7816-2, and the second plurality of contact pads may comprise at least 5 of the remaining six contact pads, as stipulated in ISO/IEC Standard 7816-2.

In chip card embodiments including a first plurality of contact pads and a second plurality of contact pads, the first and second pluralities of contact pads may be defined together on the outward-facing surface of the substrate in one or more production operations. By way of example, the first and second plurality of contact pads may be defined by copper plating and etching operations, wherein the copper contact pads may be optionally gold flashed.

In some implementations, a chip card may further include a second IC chip supportably interconnected to the inward-facing surface of the substrate. In such arrangements, the second IC chip may be electrically interconnected to the second plurality of contact pads for processing electrical contact communication signals to/from a contact chip card reader. For example, the second IC chip may comprise a processor for processing payment-related, contact communication signals to/from a contact card reader utilizing pre-programmed instructions/algorithms and personalization data (e.g. payment account identification data corresponding with a specific payment account administered by an issuer of the corresponding chip card) stored in memory thereof, e.g. in compliance with ISO/IEC Standard 7816-2.

To facilitate electrical interconnection of the second plurality of contact pads and second IC chip, each of the contact pads may be electrically interconnected through the substrate to a corresponding contact that may be electrically interconnected to the second IC chip. For example, the contacts corresponding with the second plurality of contact pads may be interconnected to the second IC chip via conductive traces/pads supportably interconnected to the inward-facing side of the substrate or via wire bonding.

In some arrangements, one or more of the contacts corresponding with the first plurality of contact pads may each be electrically interconnected with a corresponding, different one of one or more of the contacts corresponding with the second plurality of contact pads, wherein power and/or data communication signals may be provided therebetween and to/from the first IC chip and second IC chip, as well as the first plurality of contact pads for biometric signal generation.

In some embodiments, the first IC chip may be electrically interconnected to the contacts corresponding with the first plurality of contact pads utilizing flip-chip interconnections supportably interconnected to the inward-facing surface of the substrate or wire-bonded interconnections on the inward-facing side of the substrate. Further, the second IC chip may be electrically interconnected to the contacts corresponding with the second plurality of contact pads utilizing wire-bonded interconnections on the inward-facing side of the substrate or flip-chip interconnections supportably interconnected to the inwardfacing surface of the substrate.

In some embodiments, a chip card may further include a first antenna for contactless communications with a contactless chip card reader (e.g. contactless communications via radio frequency (RF) electromagnetic signals). In that regard, the first IC chip and/or the second IC chip (if provided) may be electrically interconnected to the first antenna for processing payment-related, contactless communication signals to/from a contactless chip card reader utilizing a processor and preprogrammed instructions/algorithms and personalization data (e.g. payment account identification data corresponding with a specific payment account administered by an issuer of the corresponding chip card) stored in memory thereof, e.g. in compliance with ISO/IEC Standard 14443. In that regard, the first antenna, and an optional metallic member (e.g. a second antenna), as discussed below, may be provided to receive RF electromagnetic signals from a contactless chip card reader to yield electrical signals that comprise both data communication signal and power signal components, wherein the power signal component may power chip card componentry.

In one approach, the first antenna may be supportably interconnected to the substrate. For example, the first antenna may be supportably interconnected to the inward-facing surface of the substrate. In contemplated arrangements, the first antenna may be disposed in non-overlapping relation to the contacts corresponding with the first plurality of contact pads and/or the contacts corresponding with the second plurality of contact pads.

In arrangements in which a first antenna is provided for contactless communication with a contactless chip card reader, contactless signals received from the contactless chip reader (e.g. RF electromagnetic signals) may be utilized for both payment-related data transmission to and for powering of the first IC chip and/or the second IC chip (if provided). In such embodiments, the card body may further comprise a metallic member for channeling the contactless communication signals received from a contactless chip card reader toward the first antenna. In that regard, the metallic member may be disposed in non-overlapping relation to the contacts corresponding with the first plurality of contact pads and/or the contacts corresponding with the second plurality of contact pads.

In some arrangements, the metallic member may include a second antenna disposed in spaced relation to the first antenna and in non-overlapping relation to the contacts corresponding with the first plurality of contact pads and/or the second plurality of contact pads. In some implementations, the second antenna may comprise one or more outer loop(s) and one or more inner loop(s) that define a continuous electrically conductive pathway, and wherein the inner loop(s) is disposed in opposing, spaced relation to the first antenna (e.g. for inductive coupling therewith to provide both data communication and power signal components), and in non-overlapping relation to the contacts corresponding with the first plurality of contact pads and/or the contacts corresponding with the second plurality of contact pads.

Optionally, the second antenna may be provided with an energy storage component, e.g. a capacitor and/or battery, capable of storing a sufficient amount of electrical energy to at least initially power the provision of the biometric signal by the first plurality of contact pads and processing thereof by the first IC chip. Such initial processing by the first IC chip may be completed to authenticate a user, whereupon the first IC chip and/or second IC chip (if included) may be unlocked, or enabled, for communications with a contact chip card reader and/or contactless chip card reader.

In some implementations, the card body may include a prelaminated member that includes the metallic member laminated between first and second layers (e.g. polymer-based layers). In turn, first and second core layers (e.g. polymer-based layers) may be co-laminated to opposing sides of the prelaminated member. In turn, the card body recess may be formed (e.g. via milling) to extend into at least a portion of one or both of the first and second core layers on one side of the chip card.

In another embodiment, a chip card is disclosed that includes a card body, at least one conductive contact embedded in the card body and electrically interconnected to at least one embedded electrical component, and an integrated circuit (IC) chip module located in a recess provided by the card body on one side of the chip card. The IC chip module may include a substrate (e.g. an electrically non-conductive substrate) having an outward-facing surface and an inward-facing surface, a first plurality of contact pads (e.g. electrically conductive/isolated pads) supportably interconnected to the outward-facing surface of the substrate for selective contact engagement and electric contact communication with a contact chip card reader (e.g. via contact with electrically conductive pins of the contact chip card reader). The first plurality of contact pads may be located for contact communication with a contact chip card reader in compliance with ISO/IEC Standard 7816-2. In that regard, the first plurality of contact pads may be provided to receive electrical signals from a contact chip card reader that comprises both data communication signal and power signal components (e.g. a data communication signal component imposed on a power signal component), wherein the power signal component may power chip card componentry.

The IC chip module may further comprise a first IC chip supportably interconnected to the inward-facing surface of the substrate and electrically interconnected to the first plurality of contact pads (e.g. via metallized vias extending through the substrate and electrical connections on the inward-facing side of the substrate) for processing electrical contact communication signals to/from a contact chip card reader. For example, the first IC chip may comprise a processor for processing payment-related contact communication signals to/from a contact card reader utilizing pre-programmed instructions/algorithms and personalization data (e.g. payment account identification data corresponding with a specific payment account administered by an issuer of the corresponding chip card) stored in memory thereof, e.g. in compliance with ISO/IEC Standard 7816-2.

The IC chip module may further include at least one conductive protrusion having a first end supportably interconnected at a first end to the inward-facing surface of the substrate and electrically interconnected to the first IC chip, and having a protruding second end that extends into a thickness of and is interconnected to the at least one embedded conductive contact. As may be appreciated, the inclusion of a conductive protrusion having a second end that is interconnected to and that extends into a thickness of an embedded conductive contact (e.g. via driven penetration during production) yields an IC chip card having enhanced reliability.

In some implementations, the protruding second end of the conductive protrusion may be substantially surrounded by and interconnected to the at least one embedded conductive contact. In some arrangements, the protruding second end of the at least one conductive protrusion and the at least one embedded conductive contact may be directly or indirectly fused, or welded, together during production. In some embodiments, a portion of the embedded conductive contact may wick up and around an outside surface of the second end of the conductive protrusion(s) during production, thereby further enhancing interconnection therebetween.

In contemplated arrangements, the conductive protrusion(s) may be a stud bump defined by wire-bonding at a corresponding electrical contact supportably interconnected to the inward-facing surface of the substrate. Such electrical contact may be electrically interconnected to the first IC chip via wire-bonding or by metal tracing on the inward-facing side of the substrate (e.g. when the first IC chip is mounted to the substrate in a flip-chip manner).

In some implementations, the second end of the protrusion(s) may engage and thereby apply a compression force to the embedded conductive contact(s) during production (e.g. via face-to-face and/or penetration engagement), contemporaneous with the conductive application of heat (e.g. at a temperature sufficient to melt at least an engaged portion of the embedded conductive contact(s)), thereby yielding enhanced interconnection(s). For example, the conductive protrusion(s) may be successively heated and pressed against the embedded conductive contact(s) a plurality of times to achieve enhanced interconnections(s).

In contemplated implementations, the at least one conductive protrusion(s) may comprise at least one of:
gold;
a gold alloy;
copper;
a copper alloy;
aluminum;
an aluminum alloy; and,
any soft metal or soft metal alloy.

Further, the at least one embedded conductive contact(s) may comprise at least one of: copper;
a copper alloy;
aluminum;
an aluminum alloy; and,
any soft metal or soft metal alloy.

As may be appreciated, additional alternative metals and metal alloys may comprise the conductive protrusion(s) and embedded conductive contact(s).

In some arrangements, the chip card may include a first plurality of embedded conductive contacts that are at least partially embedded in the card body and the IC chip module may include a first plurality of conductive protrusions having corresponding first ends supportably interconnected to the inward-facing surface of the substrate and electrically interconnected to different corresponding ones of a plurality of electrical contacts of the first IC chip. Further, the first plurality of conductive protrusions may have corresponding, protruding second ends that extend into a thickness of and are interconnected to different corresponding ones of the first plurality of embedded conductive contacts. Each of the first plurality of conductive protrusions and corresponding first plurality of embedded conductive contacts may comprise one or more attributes as described above in relation to said at least one conductive protrusion and said at least one embedded conductive contact, thereby yielding an improved chip card having a plurality embedded interconnections with improved reliability.

In some embodiments, the at least one embedded electrical component of the chip card may comprise a first antenna electrically interconnected to the first plurality of embedded conductive contacts, wherein by virtue of the interconnections between the first antenna, the first plurality of embedded conductive contacts, the first plurality of conductive protrusions, and the first plurality of electrical contacts of the first IC chip, the first IC chip may be provided to process payment-related, contactless communication signals to/from a contactless chip card reader. For example, the first IC chip may comprise a processor for processing contactless communication signals utilizing preprogrammed instructions/algorithms and personalization data (e.g. payment account identification data corresponding with a specific payment account administered by an issuer of the corresponding chip card) stored in memory thereof, e.g. in compliance with ISO/IEC Standard 14443. In that regard, the first antenna may be provided to receive RF electromagnetic signals from a contactless chip card reader to yield electrical signals that comprise both data communication signal and power signal components, wherein the power signal component may power chip card componentry.

The first antenna may comprise a metallic member. In one approach, the first antenna may comprise one or more conductive loop(s) that are embedded in the card body and that define a continuous electrically conductive pathway. In some arrangements, the conductive loop(s) may be located to extend about all or at least a portion of the recess of the card body.

In some embodiments, the at least one embedded electrical component of the chip card may comprise a second IC chip having a plurality of electrical contacts electrically interconnected to different corresponding ones of the first plurality of embedded conductive contacts, wherein the second IC chip is operable to process a biometric signal and transmit/receive signals to/from the first IC chip. In that regard, the biometric signal may comprise one of an electrocardiogram signal and a fingerprint signal. By virtue of the electrical interconnections between the plurality of electrical contacts of the second IC chip, the first plurality of embedded conductive contacts, the first plurality of conductive protrusions and the plurality of electrical contacts of the first IC chip, the second IC chip may be operable to process a biometric signal to authenticate a user and thereby enable operation of the first IC chip via electrical signal transmissions between the second IC chip and first IC chip. In turn, the first IC chip may operate to process contact and/or contactless payment communication signals to/from a contact and/or contactless card reader to complete a payment transaction.

In one approach for providing a biometric signal to the second IC chip, the chip card may include a second plurality of embedded conductive contacts that are at least partially embedded in the card body. Further, the IC chip module may further include a second plurality of contact pads supportably interconnected to the outward-facing surface of the substrate for contact engagement with at least one appendage of the user, wherein the second plurality of contact pads may provide an electrocardiogram biometric signal. In turn, the IC chip module may further include a second plurality of conductive protrusions having corresponding first ends supportably interconnected to the inward-facing surface of the substrate and electrically interconnected to different corresponding ones of the second plurality of contact pads, and having corresponding, protruding second ends that extend into a thickness of and are interconnected to different corresponding ones of the second plurality of embedded conductive contacts. In that regard, the second plurality of contact pads may be electrically interconnected to the first ends of said second plurality of conductive protrusions through the substrate, e.g. by metallized vias or the like. Each of the second plurality of conductive protrusions and corresponding second plurality of embedded conductive contacts may comprise one or more attributes as described above in relation to said at least one conductive protrusion and said at least one embedded conductive contact, thereby yielding an improved chip card having a plurality of embedded interconnections with improved reliability.

In other approaches for providing a biometric signal to the second IC chip, the chip card may further include at least a biometric sensor located in another recess provided by the card body, and interconnected to the second IC chip for providing a biometric signal thereto. For example, the biometric sensor may comprise one of the following:

a finger print sensor located in another recess provided by the card body, and electrically interconnected to the second IC chip; and, an electrocardiogram sensor located in another recess provided by the card body, and electrically interconnected to the second IC chip.

In conjunction with such arrangements, the biometric sensor may be electrically interconnected to the second IC chip via embedded electrical conductors (e.g. metal wires and/or traces).

Additional features and advantages of the present invention will become apparent upon consideration of the description that follows.

BRIEF DESCRIPTION OF THE DRAWINGS

FIG. 5A is a cross-sectional view of another chip card embodiment that comprises another one of the IC chip module embodiments shown in FIG. 3A at cross section plane AA in FIG. 3A.

FIG. 5B is an enlarged view of a portion of the IC chip module embodiment shown in FIG. 5A.

DETAILED DESCRIPTION

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such embodiments or other embodiments and with various modifications required by the particular application(s) or use(s) of the present invention.

Figure 1A:
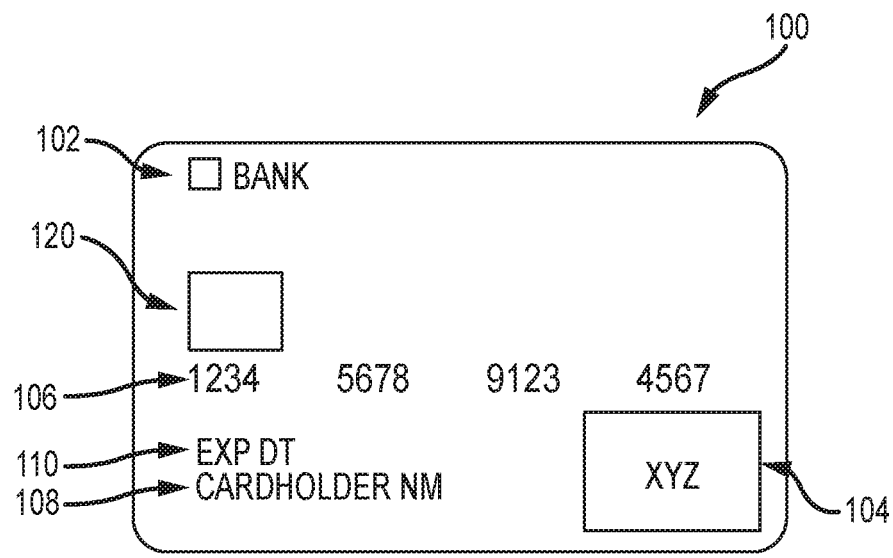
FIGS. 1A and 1B are front and back views, respectively, of a chip card embodiment.
Figure 1B:
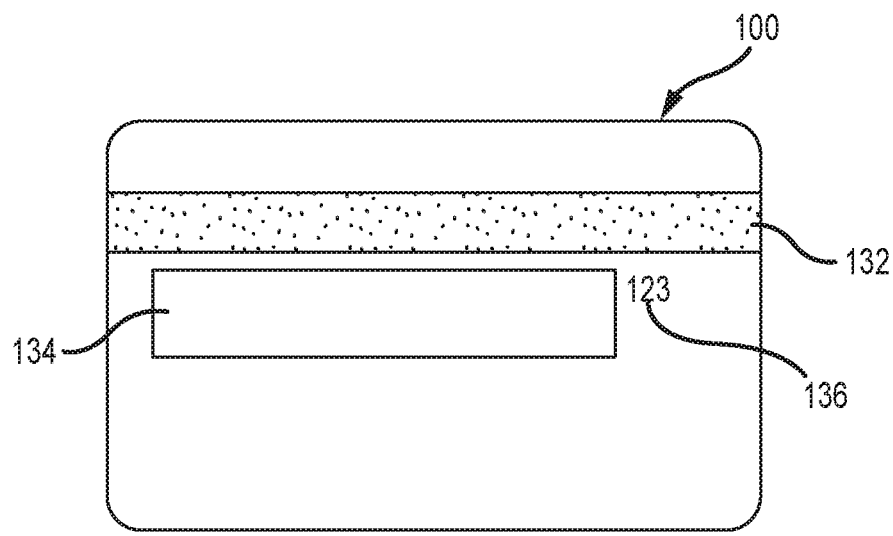

FIGS. 1A and 1B are front and back views, respectively, of an embodiment of a payment chip card (100). As shown in FIG. 1A, a front face of chip card (100) may include an issuer payment institution identifier (102) (e.g. a name and/or logo) and a payment processing institution identifier (104) (e.g. a name and/or logo). Further, personalization data corresponding with a single specific payment account administered by the issuer payment institution may be provided on the front face of the chip card (100). For example, the personalization data may include payment account identification indicia (106) (e.g. a payment account number or other indicia that may be correlated to a payment account administered by the issuer payment institution), a card holder name (108) (e.g. the name of an individual to whom the chip card has been issued by the issuer payment institution), and an expiration date (110) associated with the given payment account. Additionally, a region (120) may be provided for inclusion of an integrated circuit (IC) chip. For contact chip cards, region (120) may also receive a contact plate having contact pads for electrical contact interface with a contact chip card reader. In that regard, region (120) may receive an IC chip module in a recess thereof, as will be further described.

As shown in FIG. 1B a back face of chip card (100) may include a magnetic stripe (132) comprising magnetically encoded data corresponding with the given payment account associated with the chip card (100). Additionally, a signature block (134) may be provided for receiving a signature by the individual issue to whom the chip card (100) is issued for exclusive use. Further, at least one card security code (136) may be provided, wherein the card security code (136) may be required in connection with use of the chip card (100) to complete a given payment transaction.

In a modified arrangement, the payment processor identifier (104) and/or all or a portion of the personalization data may be provided on a back face of chip card (100). For example, the payment processor identifier (104) may be provided in a bottom right region of the back face of chip card (100), and the payment account identification indicia (106), expiration data (110) and card holder name (108) may be provided in successive rows below signature block (134).

In various embodiments, the payment account identification indicia (106) may be embossed or printed for viewing from the front face or back face of chip card (100). In that regard, when embossing is utilized, the embossed payment account identification indicia (106) may be located to the side of region (120) (e.g. to the right side of region (120) when viewing the front face of chip card (100)), thereby accommodating a region (120) of increased height for receipt of an IC chip module in a recess thereof, as described below.

Figure 2B:
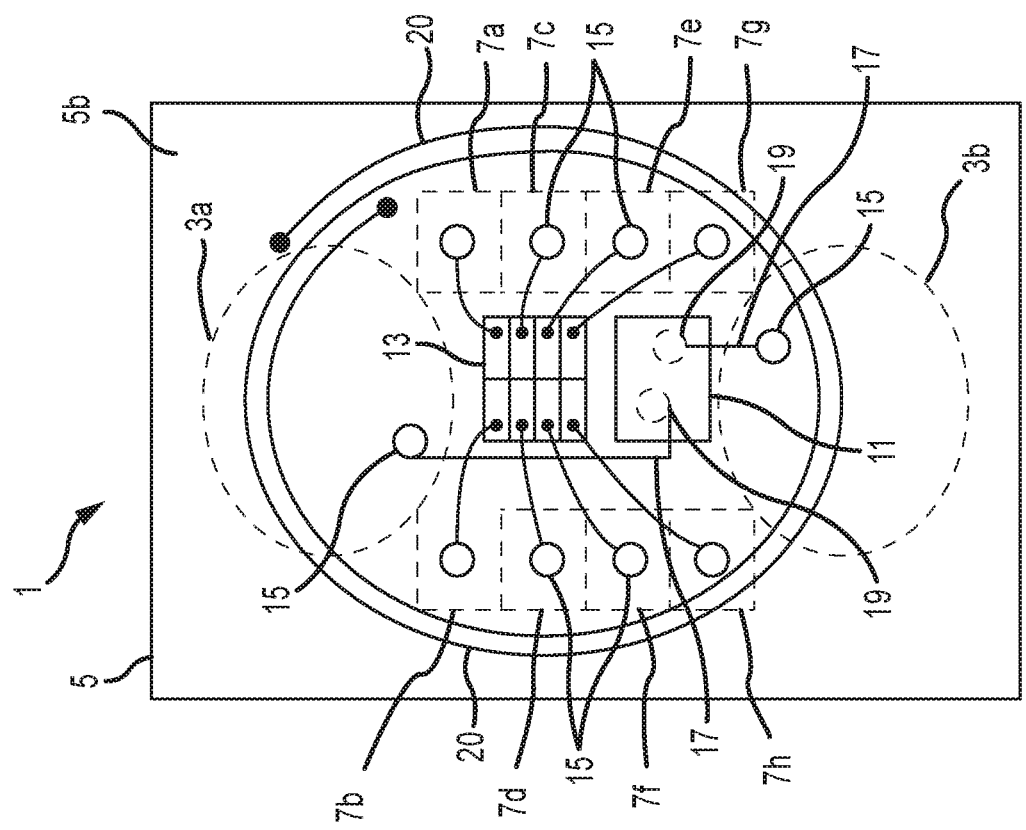
FIGS. 2A and 2B are front and back views, respectively, of an integrated circuit (IC) chip module embodiment employable in a chip card.
Figure 2A:
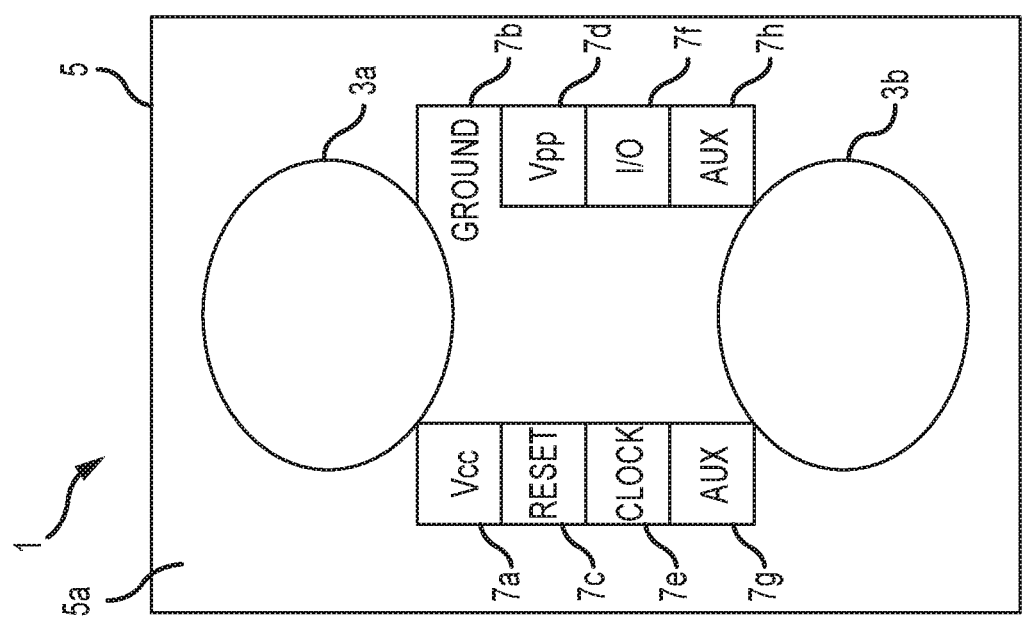

Reference is now made to FIGS. 2A and 2B which illustrate front and back views, respectively, of one embodiment of an integrated circuit (IC) chip module (1) for use in a chip card, e.g. for use within or at least partially within a region of a payment chip card corresponding with region (120) of chip card (100) referenced above. More particularly, the IC chip module (1) may be provided for positioning within a recess defined on one side (e.g. a front face) of a chip card.

In the embodiment shown in FIG. 2A, IC chip module (1) may include a first plurality of contact pads (3a, 3b) (e.g. electrically conductive and isolated pads such as copper pads that may be gold-plated) supportably interconnected to an outward-facing surface (5a) of a substrate (5) (e.g. an electrically nonconductive substrate such as a glass epoxy substrate) for contact engagement with at least one appendage of a user. Contact pads (3a, 3b) may function as biometric sensor pads to provide a biometric signal, as will be further described. Additionally, a second plurality of contact pads (7a-7h) (e.g. electrically conductive and isolated pads such as copper pads that may be gold-plated) may be supportably interconnected to outward-facing surface (5a) of substrate (5), at least a portion of which are located for contact with a contact chip card reader to transmit/receive electrical communication signals (e.g. communication signals associated with a given payment transaction), in compliance with ISO/IEC Standard 7816-2. In that regard, the second plurality of contact pads (7a-7h) may be provided to receive electrical signals from a contact chip card reader that may comprise data communication signal and power signal components (e.g. a data communication signal component imposed on a power signal component), wherein the power signal component may power chip card componentry.

As shown in FIG. 2B, IC chip module (1) may also include a first integrated circuit (IC) chip (11) supportably interconnected to an inward-facing surface (5b) of the substrate (5) and electrically interconnected to the first plurality of contact pads (3a, 3b) for processing an electrical biometric signal received therefrom. In that regard, first IC chip (11) may comprise a processor for processing the biometric signal in relation to a corresponding predetermined biometric signature stored in memory of the first IC chip (11), utilizing preprogrammed instructions/algorithms stored in the memory. As may be appreciated, the predetermined biometric signature may be unique to an individual to whom a corresponding chip card has been issued for exclusive use (e.g. use to make payments against a payment account administered by or on behalf of a payment institution issuer of the chip card). Such processing may be conducted to authenticate a user as being the authorized issuee of the chip card, wherein upon such authentication, the first IC chip (11) may enable, or unlock, the corresponding chip card for use with a chip card reader (e.g. a contact and/or contactless chip card reader device located at a point-of-sale and operable to transmit/receive communication signals to/from a chip card).

In that regard, as further shown in FIG. 2B, a second IC chip (13) may be supportably interconnected to an inward-facing surface (5b) of the substrate (5) and electrically interconnected to at least a portion of the second plurality of contact pads (7a-7h) for processing electrical communication signals received from/transmitted to a contact chip reader, e.g. wherein the portion of the second plurality of contact pads (7a-7h) includes at least 5 of contact pads (7a-7f) that are provided with a second IC chip (13) in compliance with ISO/IEC Standard 7816-2. In that regard, second IC chip (13) may comprise a processor for processing payment-related contact communication signals to/from a contact card reader utilizing preprogrammed instructions/ algorithms and personalization data (e.g. payment account identification data corresponding with a specific payment account administered by an issuer of the corresponding chip card) stored in memory thereof, e.g. in compliance with ISO/IEC Standard 7816-2.

For purposes of illustrating the noted electrical interconnections, FIG. 2B shows the first plurality of contact pads (3a, 3b) of FIG. 2A in phantom lines, and the second plurality of contact pads (7a-7h) of FIG. 2A in phantom lines. As shown, each of the first plurality of contact pads (3a, 3b) and second plurality of contact pads (7a-7h) may be electrically interconnected through substrate (5) (e.g. via metalized vias) to corresponding electrically-conductive contacts (15) supportably interconnected to the inward-facing surface (5b) of substrate (5). In turn, some or all of the contacts (15) corresponding with the second plurality of contact pads (7a-7h) may be electrically interconnected (e.g. via wire bonded interconnections) with different corresponding ones of a plurality of contact regions provided on an inward-facing side of second IC chip (13).

The contacts (15) corresponding with the first plurality of contact pads (3a, 3b) may be electrically interconnected to first IC chip (11) via metal traces (17) and metal pads (19) (shown in phantom lines) supportably interconnected to the inward-facing surface (5b) of the substrate (5) for contact with contact regions provided on an upward-facing side of first IC chip (11). In turn, the first IC chip (11) may be oriented for flip-chip interconnection to the metal pads (19).

While not shown, one or more of the contacts (15) corresponding with the first plurality of contact pads (3a, 3b) may each be electrically interconnected with a corresponding different one of one or more of the contacts (15) corresponding with the second plurality of contact pads (7a-7h), wherein power and/or data communication signals may be provided therebetween and to/from the first IC chip (11) and second IC chip (13), as well as the first plurality of contact pads (3a, 3b) for biometric signal generation. For example, the contact (15) corresponding with contact pad (7a) (i.e. power supply pad "Vcc") and/or the contact (15) corresponding with contact pad (7b) (i.e. ground pad "Ground") may be electrically interconnected to the contact (15) and/or pad (19) corresponding with contact pad (3a), and/or to the contact (15) and/or pad (19) corresponding with contact pad (3b). Further, one or more contact regions of the first IC chip (11) may each be electrically connected to a corresponding different one of one or more contact regions of the second IC chip (13).

As illustrated in FIG. 2B, IC chip module (1) may further include a first antenna (20) supportably interconnected to the inward-facing surface of the support (5) for payment-related contactless communications with a contactless card reader, e.g. via radio frequency (RF) electromagnetic signals. The first antenna may comprise one or a plurality of electrically conductive, interconnected, and coincidental loops. As shown, the first antenna (20) may be provided in non-overlapping relation to contacts (15). For example, the first antenna (20) may extend around contacts (15).

The first antenna (20) may provide electrical signals to and receive electrical signals from different ones of some or all of the contact regions on the inward-facing side of the second IC chip (13), wherein contactless communication signals may be processed by the second IC chip (13). In that regard, the first antenna (20) may include a plurality of landing regions (not shown) located for electrical connection to different ones of the contact regions on the inward-facing side of the second IC chip (13). Further, additional features may be provided as described below in relation to FIGS. 3A, 3B and 4.

Returning now to FIG. 2A, the first plurality of contact pads (3a, 3b) may include a first contact pad (3a) that is spaced from a second contact pad (3b) by predetermined distance to facilitate separate engagement with first and second appendages of a user so as to provide an electrocardiogram (ECG) signal to the first IC chip (11) for processing. In that regard, the first and second appendages may be different fingers on the same hand or of different hands of a user.

IC chip module (1) may be sized so that the periphery of substrate (5) may be located into a complimentarily configured recess defined on one side of a card body comprising a chip card (e.g. defined via milling operations). In that regard, the second plurality of contact pads (7a-7h) may be located within a predetermined area within the recess, and the first plurality of contact pads (3a, 3b) may be located outside of and adjacent to that predetermined area within the recess on one side of the chip card. In that regard, the first pad (3a) and second pad (3b) of the first plurality of contact pads (3a, 3b) may be spaced by at least a predetermined distance that is greater than a distance between any two of the second plurality of contact pads (7a-7h), as shown in FIG. 2A.

In some arrangements, including the embodiment shown in FIG. 2A, the second plurality of contact pads (7a-7h) may be located for contact communications with contact pins of a contact card reader in compliance with ISO/IEC Standard 7816-2. In a modified embodiment, two of the second plurality of contact pads (7a-7h) shown in FIG. 2A may be utilized as biometric sensor pads in place of the first plurality of contact pads (3a, 3b) shown in FIG. 2A, For example, contact pad (7g) and contact pad (7h) may be utilized for contact engagement with at least one appendage of a user to provide a biometric signal, while contact pads (7a-7f) may be utilized for electrical contact communication signal transmissions to/from a contact card reader.

Figure 3B:
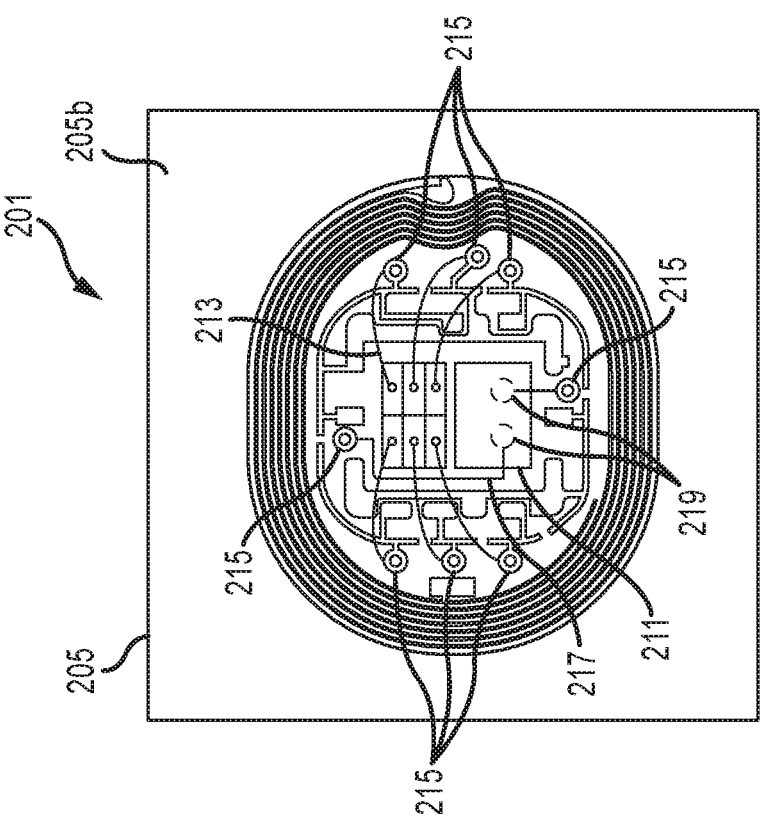
FIG. 3B is a back view of one of the IC chip module embodiments shown in FIG. 3A.
Figure 3A:
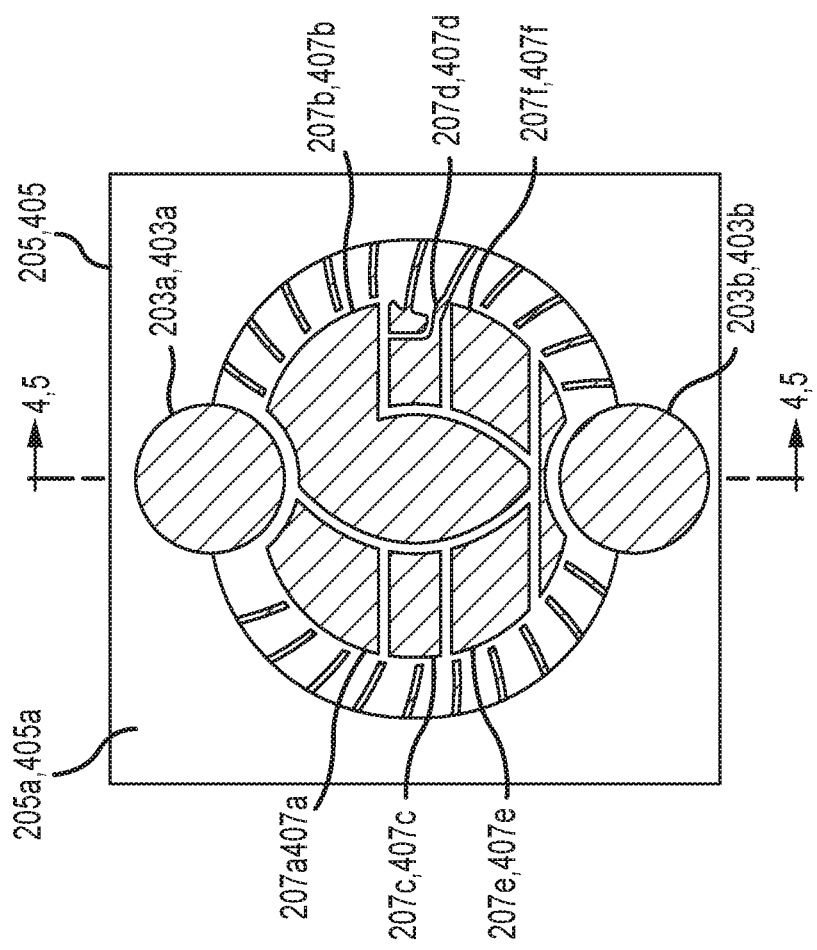
FIG. 3A is a front view of two additional embodiments of an IC chip module employable in a chip card.

Reference is now made to FIGS. 3A and 3B which illustrate front and back views, respectively, of another embodiment of an IC chip module (201). IC chip module (201) may include a first plurality of contact pads (203a, 203b) supportably interconnected to an outward-facing surface (205a) of a substrate (205) for contact engagement with at least one appendage of a user. Additionally, a second plurality of contact pads (207a-207f) may be supportably interconnected to outward-facing surface (205a) of substrate (205), at least a portion of which are located for electrical contact communications with a contact chip card reader (not shown). In some embodiments, the second plurality of contact pads (207a-207f) may be located in compliance with ISO/IEC Standard 7816-2.

As shown in FIG. 3B, IC chip module (201) may also include a first IC chip (211) supportably interconnected to an inward-facing surface (205b) of substrate (205) and electrically interconnected to the first plurality of contact pads (203a, 203b) as shown in FIG. 3A, for processing a biometric signal received therefrom. Further, a second IC chip (213) may be supportably interconnected to inward-facing surface (205b) of substrate (205) and electrically interconnected to different corresponding ones of the portion of the second plurality of contact pads (207a-207f) for processing contact communication signals to/from a contact chip reader.

As shown in FIG. 3B, each of the first plurality of contact pads (203a, 203b) shown in FIG. 3A may be electrically interconnected through substrate (205) to corresponding electrically conductive contacts (215) supportably interconnected to the inward-facing surface (205b) of substrate (205). Similarly, each of the second plurality of contact pads 207a-207f) may be electrically interconnected through substrate (205) to corresponding electrically conductive contacts (215) supportably interconnected to the inward-facing surface (205b) of substrate (205). In turn, some or all of the contacts (215) corresponding with the second plurality of contact pads (207a-207f) may be electrically interconnected (e.g. via wire-bonded interconnections) with different corresponding ones of a plurality of contact regions provided on an inward-facing side of second IC chip (213).

The contacts (215) corresponding with the first plurality of contact pads (203a, 203b) may be electrically interconnected to first IC chip (211) via metal traces (217) and metal pads (219) (shown in phantom lines) provided on the inward-facing surface (205b) of the substrate (205). In turn, the first IC chip (211) may be oriented for flip-chip interconnection to the metal pads (219).

While not shown, one or more of the contacts (215) corresponding with the first plurality of contact pads (203a, 203b) may each be electrically interconnected with a corresponding different one of one or more of the contacts (215) corresponding with the second plurality of contact pads (207a-207f), wherein power and/or data communication signals may be provided therebetween and to/from the first IC chip (211) and second IC chip (213), as well as the first plurality of contact pads (203a, 203b) for biometric signal generation. For example, the contact (215) corresponding with contact pad (207a) and/or the contact (215) corresponding with contact pad (207b) may be electrically interconnected to the contact (215) and/or pad (219) corresponding with contact pad (203a), and/or to the contact (215) and/or pad (219) corresponding with contact pad (203b). Further, one or more contact regions of the first IC chip (211) may each be electrically connected to a corresponding different one of one or more contact regions of the second IC chip (213).

As illustrated in FIG. 3B, IC chip module (201) may further include a first antenna (220) supportably interconnected to the inward-facing surface of the support (205) for contactless communications (e.g. RF electromagnetic signals) with a contactless card reader. As shown, the first antenna (220) may be provided in non-overlapping relation to the contacts (215).

The first antenna (220) may be provided for electrical signal transmission to/from different ones of some or all of the contact regions on the inward-facing side of the second IC chip (213). In that regard, the first antenna (220) may include a plurality of landing regions located to contact different ones of the contact regions in face-to-face relation.

Returning now to FIG. 3A, the first plurality of contact pads (203a, 203b) may include a first contact pad (203a) that is spaced from a second contact pad (203b) by a predetermined distance to facilitate separate engagement of first and second appendages of a user so as to provide an ECG signal to the first IC chip (211) for biometric processing. In that regard, first and second appendages may be different fingers on the same hand or of different hands of a user.

As will be further described, IC chip module (201) may be sized so the periphery of substrate (205) may be located within a complimentarily configured recess defined on one side of a card body comprising a chip card. In that regard, the second plurality of contact pads (207a-207f) may be located within a predetermined area within the recess and the first plurality of contact pads (203a, 203b), may be located outside and adjacent to that predetermined area within the recess on the one side of the chip card. In that regard, the first pad (203a) and second pad (203b) of the first plurality of contact pads (203a, 203b) may be spaced by at least a predetermined distance that is greater than the distance between any two of the second plurality of contact pads (207a-207f), as shown in FIG. 3A.

Figure 4:
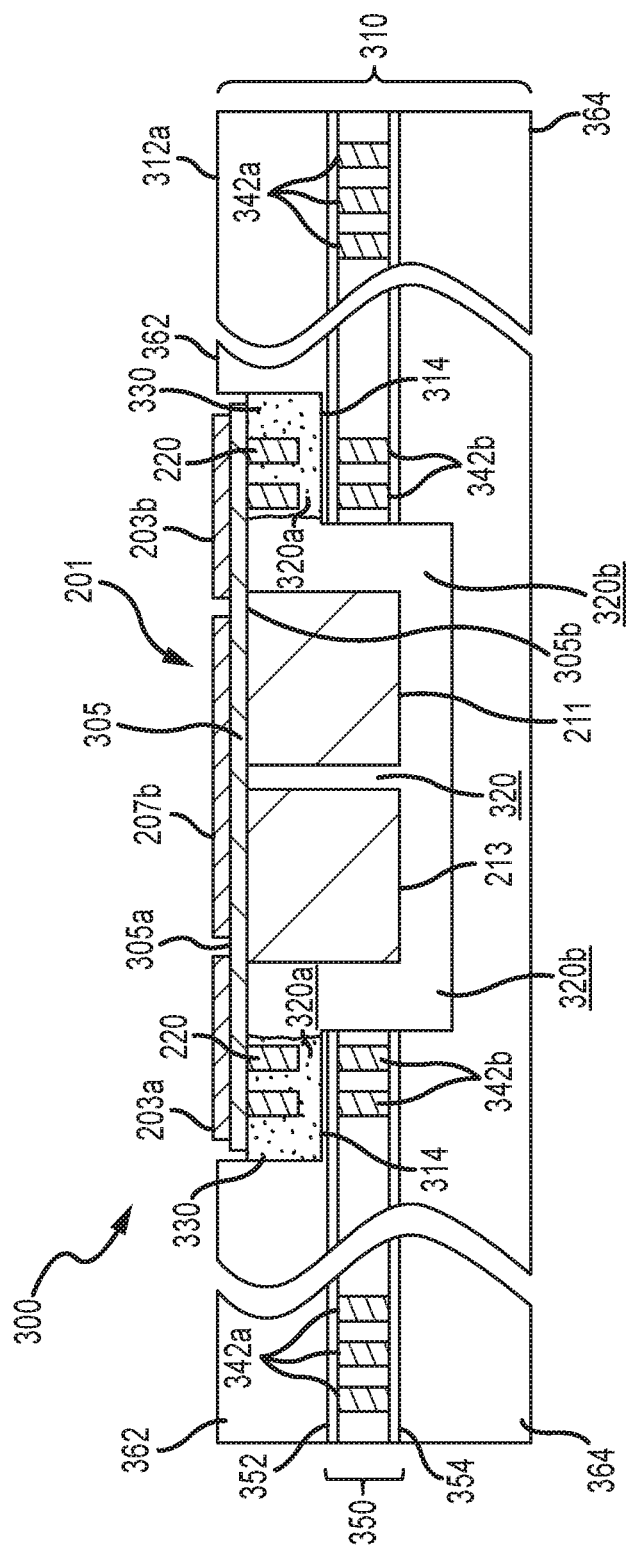
FIG. 4 is a cross-sectional view of a chip card embodiment that comprises one of the IC chip module embodiments shown in FIG. 3A at cross section plane AA shown in FIG. 3A.

Reference is now made to FIG. 4 which illustrates an embodiment of a chip card (301) having a card body (310) with a recess (320) defined on one side (312a) of the card body (310), and having the IC chip module (201) described above in relation to FIGS. 3A and 3B located within the recess (320). As shown, recess (320) may include an outer first portion (320a) having a first depth, and an inner second portion (320b) having a second depth that is greater than the first depth, wherein a ring-shaped landing (314) is defined by card body (310) to support the IC chip module (201). More particularly, the peripheral portion of the IC chip module (201) may be supportably interconnected to the card body (310) of chip card (301) at the landing (314) via interconnection material (330) (e.g. an adhesive such as a hot melt adhesive, a light curable adhesive, etc.).

Card body (310) may include a metallic member of a ring-shaped configuration for receiving and channeling RF electromagnetic signals between a contactless chip reader and first antenna (220) of IC chip module (201). More particularly, in the illustrated embodiment, the metallic member may comprise a second antenna (342a, 342b) having one or more outer loop(s) (342a) and one or more inner loop(s) (342b), wherein the outer loop(s) (342a) and inner loop(s) (342b) define a continuous, electronically conductive pathway. As shown, the inner loop(s) (342b) is disposed in opposing, spaced relation to the first antenna (220) of the IC chip module (201) for non-contact coupling therewith (e.g. inductive coupling). In other arrangements, a direct electrical interconnection may be provided between second antenna (342a, 342b) and the first antenna (220).

The second antenna (342a, 342b) may be provided so that a minimum cross-dimension the outer loop(s) (342a) is greater than a maximum cross-dimension of the inner loops (342b) (e.g. at least 2 times greater). As may be appreciated, both outer loop(s) (342a) and inner loop(s) (342b) may comprise any number of loops greater/lesser than that shown in FIG. 4. As shown, the inner second portion (320b) of recess (320) may extend through the inner loop(s) (342b).

Optionally, the second antenna (342a, 342b) may be provided with an energy storage component, e.g. a capacitor and/or battery, capable of storing a sufficient amount of electrical energy to at least initially power the provision of the biometric signal by the first plurality of contact pads (203a, 203b) and processing thereof by the first IC chip (211). Such initial processing by the first IC chip (211) may be completed to authenticate a user, whereupon the first IC chip (211) and/or second IC chip (213) (if included) may be unlocked, or enabled, for communications with a contact chip card reader and/or contactless chip card reader.

In the embodiment illustrated in FIG. 4, the metallic member, and more particularly the second antenna (342a, 342b) may be provided in a prelaminated member (350). The prelaminated member (350) may include the second antenna (342a, 342b), and optional capacitor and/or battery, laminated between opposing first and second layers (352), (354), each comprising a polymer-based material (e.g. a PET material). In turn, the prelaminated member (350) may be laminated between opposing first and second core layers (362, 364), each comprising a polymer-based material (e.g. a PVC material). The second antenna (342a, 342b) may comprise aluminum disposed on a first side of a substrate, with loop start and loop end locations extended through the substrate to a second side of the substrate with a bridge therebetween on the second side.

Reference is now made to FIG. 5A which illustrates another embodiment of a chip card (400) having a card body (410) with a recess (420) defined on one side (412a) of the card body (410), and having another embodiment of an IC chip module (401) located within the recess (420). A front view of the IC chip module (401) is shown in FIG. 3A and includes a first plurality of contact pads (407a-407f) supportably interconnected to an outward-facing surface (405a) of substrate (405), all or at least a portion of which are located for electrical contact communications with a contact chip card reader (not shown). In some embodiments, the first plurality of contact pads (407a-407f) may be located in compliance ISO/IEC Standard 7816-2. Optionally, IC chip module (401) may further include a second plurality of contact pads (403a, 403b), supportably interconnected to the outward-facing (405a) of substrate (405) for contact engagement with at least one appendage of a user to provide a biometric signal.

As shown in FIG. 5A, IC chip module (401) may also include a first IC chip (413) supportably interconnected to an inward-facing surface (405b) of substrate (405) and electrically interconnected to different corresponding ones of all or a portion of the second plurality of contact pads (407a-407f) for processing contact communication signals to/from a contact chip card reader. In that regard, each of the first plurality of contact pads (407a-407f) may be electrically interconnected through substrate (405) to corresponding electrically conductive contacts (not shown) supportably interconnected to the inward-facing surface (405b) of substrate (405), wherein some or all of such contacts may be electrically interconnected (e.g. via wire-bonded interconnections) with different corresponding ones of a plurality of contact regions provided on an inward-facing side of the first IC chip (413) (e.g. in a manner analogous to that shown and discussed above in relation to electrical connections between contacts (15) and second IC chip (13) in FIG. 2B, and electrical connections between contacts (215) and second IC chip (213) in FIG. 3B. Alternatively, such interconnection may be provided by metal traces located on the inward-facing (405b) of substrate (405) with first IC chip (413) oriented for flip-chip interconnection.

As shown in FIG. 5A, the recess (420) may include an outer first portion (420a) having a first depth, and an inner second portion (420b) having a second depth that is greater than the first depth, wherein a ring-shaped landing (414) is defined by card body (410) to support IC chip module (401). The second portion (420b) and first portion (420a) may be defined by successive milling operations or a single-step milling operation. In any case, the recess (420) is defined prior to mounting of the IC chip module (401) therewithin. In the later regard, an adhesive (430) may utilized in the second portion (420b) of recess (420) to secure the IC chip module (401) to the card body (410).

As further illustrated in FIG. 5A, card body (410) may be provided to have a first plurality of embedded conductive contacts (460) that are each at least partially embedded in the card body (410). Further, card body (410) may include a metallic member for receiving and channeling RF electromagnetic signals between a contactless chip reader to/from the IC chip module (401). More particularly, in the illustrated embodiment, the metallic member may comprise an antenna (442) embedded within the card body (410) and having one or more loops that define a continuous electrical pathway, wherein the antenna (442) may be electrically interconnected at spaced locations to the different ones of the first plurality of embedded conductive contacts (460) (e.g. two conductive contacts (460) shown in FIG. 5A).

Additionally, IC chip module (401) may include a first plurality of conductive protrusions (470) each having a first end supportably interconnected to the inward-facing surface (405b) of the substrate (405) and electrically connected to a different corresponding one of the contact regions of the first IC chip (413). Further, and as shown in FIGS. 5A and 5B, each of the first plurality of conductive protrusions (470) may have a protruding second end that extends into a thickness of a different corresponding one of the plurality of embedded conductive contacts (460) (e.g. via driven penetration during production), thereby providing direct and reliable electrical interconnections between the first IC chip (413) and antenna (442) for processing wireless communication signals to/from a contactless chip card reader, as otherwise described herein.

In some arrangements, and as shown in FIG. 5A, card body (410) may the further comprise a second IC chip (415) embedded or at least partially embedded therein, and operable for processing biometric signals and for signal communications to/from the first IC chip (413). In the later regard, the card body (410) may further comprise a second plurality of embedded conductive contacts (462) that are each at least partially embedded in the card body (410), wherein different ones of the second plurality of embedded conductive contacts (462) are electrically interconnected to different ones of a plurality of contact regions of the second IC chip (415). In turn, the IC chip module (401) may include a second plurality of conductive protrusions (472) each having a first end supportably interconnected to the inward-facing surface (405b) of the substrate (405) and electrically connected to a different corresponding one of the contact regions of the first IC chip (413). Further, and as shown in FIGS. 5A and 5B, each of the second plurality of conductive protrusions (472) may have a protruding second end that extends into a thickness of a different corresponding one of the second plurality of embedded conductive contacts (462) (e.g. via driven penetration during production) thereby providing direct and reliable and electrical interconnections between the first IC chip (413) and second IC chip (415) for signal communications therebetween. By way of example, upon processing of a biometric signal, the second IC chip (415) may be provided to authenticate a user and thereby provide a signal to the first IC chip (413) so as to enable the IC chip to process signals to/from a contact chip card reader and/or contactless chip card reader to complete the payment transaction.

Further in that regard, card body (410) may be provided to include a biometric sensor (480) located in another recess (422) defined on the same one side (412a) of the card body (410), wherein the biometric sensor is electrically interconnected via embedded electrically conductive pathways to a second IC chip (415). In one approach, the biometric sensor (480) may comprise a fingerprint sensor electrically interconnected to the second IC chip (415) to provide a biometric fingerprint signal to the second IC chip (415) for processing to authenticate a user and thereby enable the first IC chip (413) for contact or wireless communications with a contact or contactless chip card reader. In another approach, biometric sensor (480) may comprise an electrocardiogram sensor for providing a biometric electrocardiogram signal to the second IC chip (415) for processing to authenticate a user and thereby enable the first IC chip (413).

In arrangements in which chip card (400) includes an embedded or partially embedded IC chip (e.g. second IC chip (415)) and/or biometric sensor (480) having embedded electrical connections, the chip card (400) may include additional embedded electrical componentry, including for example an electrical power storage device (482) (e.g. a capacitor and/or battery) for powering chip card operations.

In other arrangements, and as noted above, chip card module (401) of chip card (400) may include a second plurality of contact pads (403a, 403b) for contact engagement with at least one appendage of a user to provide biometric signals. In one approach, second plurality of contact pads (403a, 403b) may provide biometric signals to an embedded or partially embedded IC chip (e.g. second IC chip (415)) utilizing a third plurality of embedded conductive contacts (464) that are each at least partially embedded in the card body (410) and a third plurality of conductive protrusions (474). More particularly, each of the third plurality of conductive protrusions (474) may have a first end supportably interconnected to the inward-facing surface (405b) of the substrate (405) and electrically connected to a different corresponding one of the second plurality of contact pads (403a, 403b). Further, each of the third plurality of conductive protrusions (474) may include a protruding second end that extends into a thickness of a different corresponding one of the third plurality of embedded conductive contacts (464) (e.g. via driven penetration during production), thereby providing direct and reliable electrical interconnections between the second plurality of contact pads (403a, 403b) and the embedded IC chip (e.g. second IC chip (415)) for processing biometric electrocardiogram signals. Again, such biometric signals may be processed by the embedded IC chip (e.g. second IC chip (415)) to authenticate a user and thereby provide signals to the first IC chip (413) to enable the first IC chip (413) to complete a payment transaction via contact signal communications and/or contactless communication signals.

In another approach, and as otherwise described hereinabove, the IC chip module (401) of chip card (400) may include another IC chip (411) interconnected to an inward-facing side (405b) of substrate (405) for processing of biometric signals (e.g. received from the second plurality of contact pads (403a, 403b)) in place of the embedded IC chip (e.g. second IC chip (415)) described above.

In relation to any or all of the first plurality of conductive protrusions (470), second plurality of conductive protrusions (472), and/or third plurality of conductive protrusions (474) described above, the protruding second ends thereof may be substantially surrounded by and physically interconnected to the corresponding embedded or partially embedded conductive contact (460, 462 or 464). In one approach, each protruding second end and corresponding embedded conductive contact may be fused, or welded, together. Further, in contemplated arrangements, each conductive protrusion may be a stud-bump defined by wire-bonding at a corresponding electrical contact supportably interconnected to the inward-facing surface (405b) of substrate (405) of the IC chip module (401). Such electrical contact may be electrically interconnected to the first IC chip (413), second plurality of contact pads (403a, 403b) (e.g. as discussed above), or another IC chip (411), via wire-bonding or by metal traces.

In contemplated implementations, each of the conductive protrusions (470, 472 and 474) and/or embedded conductive contacts (460, 462, and 464) may comprise at least one of:
gold;
a gold alloy;
copper;
a copper alloy;
aluminum; and,
an aluminum alloy.
As may be appreciated, alternative soft metals and soft metal alloys may be utilized to define the conductive protrusions.

As noted above, each of the conductive protrusions comprising the first plurality of conductive protrusions (470), the second plurality of conductive protrusions (472), and the third plurality of conductive protrusions (474) may comprise a protruding second end that extends in to a thickness of a corresponding one of the first plurality of embedded conductive contacts (460), second plurality of embedded conductive contacts (462), and third plurality of embedded conductive contacts (464), respectively. In that regard, such positioning may be achieved in a production process by simultaneously and successively applying heat and pressure for limited time periods (e.g. 1.5 seconds or less, and preferably, 1 second or less) to an outward-facing surface of the IC chip module (401) at locations aligned with each of the protrusions. By way of example, a press machine having one or a plurality of temperature controlled heads may be controlled so that the head(s) successively engages, heats and applies pressure to at least a portion of the first plurality of contact pads (407a-407f) in regions substantially aligned with the conductive protrusions (470, 472, and 474). In turn, the conductive protrusions (470, 472, and 474) may compressively engage and heat the corresponding embedded conductive contacts (460, 462, and 464) to yield interconnections therebetween.

In the embodiment illustrated in FIG. 5, the antenna (442), the embedded contacts (460, 462 and 464), the second IC chip (415), the electrical power storage device (482), and optionally the biometric sensor (480), may be provided in a prelaminated member (450). The prelaminated member (450) may include the antenna (442), embedded contacts (460, 462 and 464), second IC chip 415, electrical power storage device (482), and electrical conductors therebetween, disposed on a substrate (not shown) and laminated between opposing first and second layers (452), (454), each comprising a polymer-based material (e.g. a PET material). In turn, the prelaminated member (450) may be laminated between opposing first and second core layers (462, 464), each comprising a polymer-based material (e.g. a PVC material). The antenna (442) may comprise aluminum disposed on a first side of the substrate, with loop start and loop end locations extended through the substrate to a second side of the substrate with a bridge therebetween on the second side.

Figure 6:
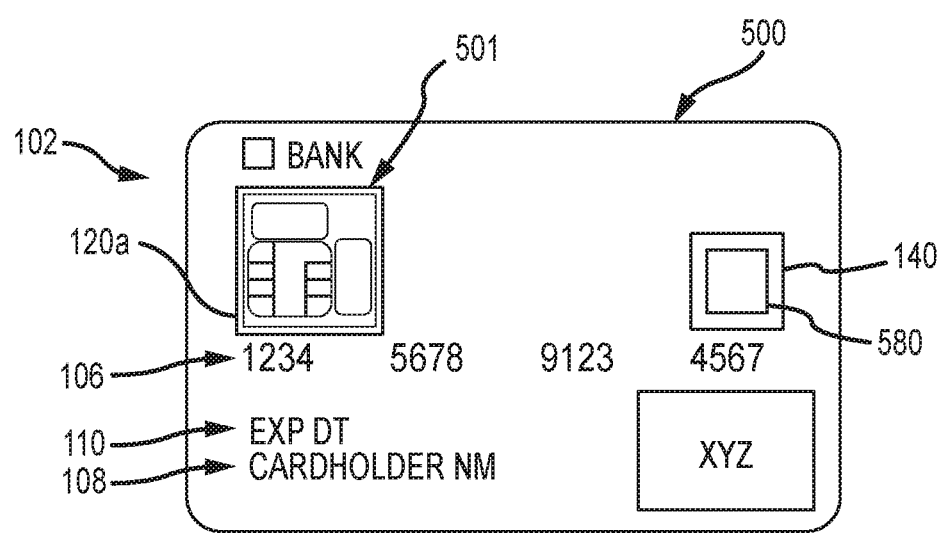
FIG. 6 is a front view of another chip card embodiment.

Reference is now made to FIG. 6 which shows a front view of another embodiment of a payment chip card (500). The payment chip card (500) includes many of the same features described above in relation to the chip card (100) shown in FIGS. 1A and 1B, and as such common reference numerals are utilized in relation to such features in FIG. 7 and the description thereof provided hereinabove applies to the payment chip card (500). In contrast to the payment chip card (100) shown and described in relation to FIGS. 1A and 1B above, the chip card (500) shown in FIG. 6 includes an enlarged region (120a) comprising a recess for receiving another embodiment of IC chip module (501), as will be further described. Further, chip card (500) includes a second region (140) comprising another recess for receiving a biometric sensor (580), in a manner analogous to that described above in relation to FIG. 5.

Figure 7A:
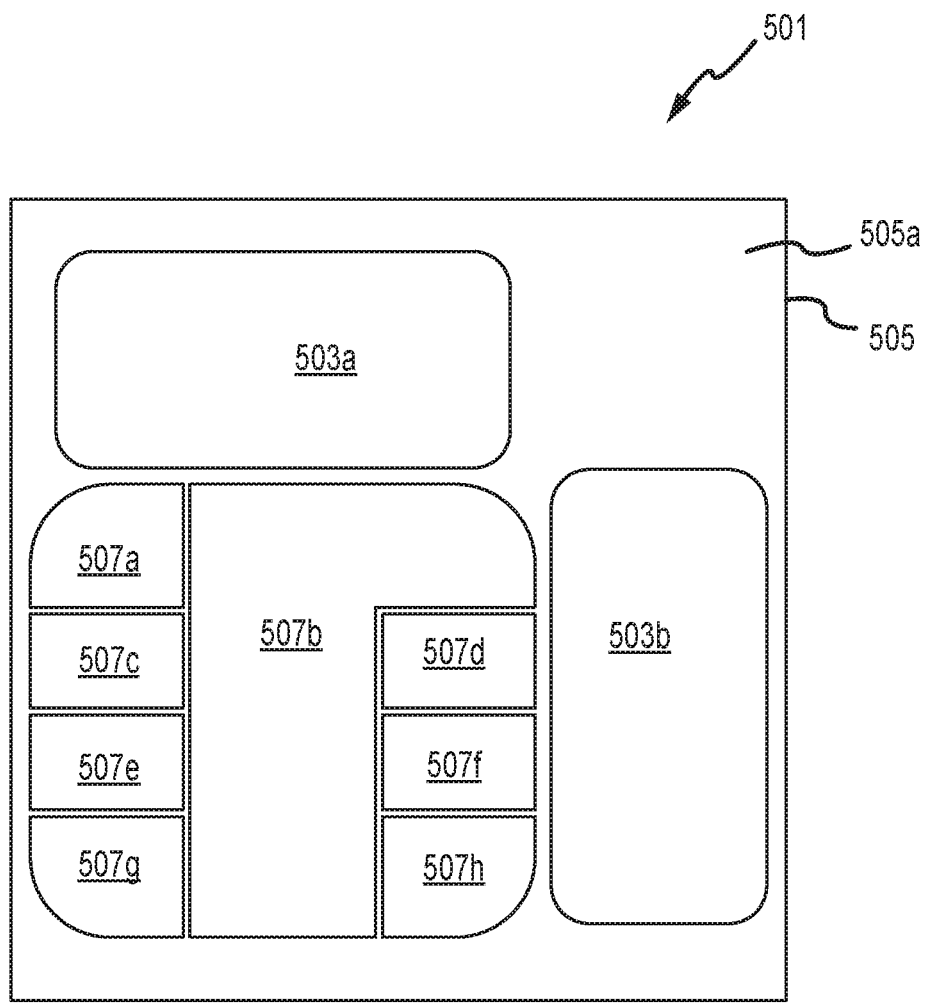
FIGS. 7A and 7B are front and back views, respectively, of another integrated circuit (IC) chip module embodiment employable in the chip card embodiment of FIG. 6.
Figure 7B:
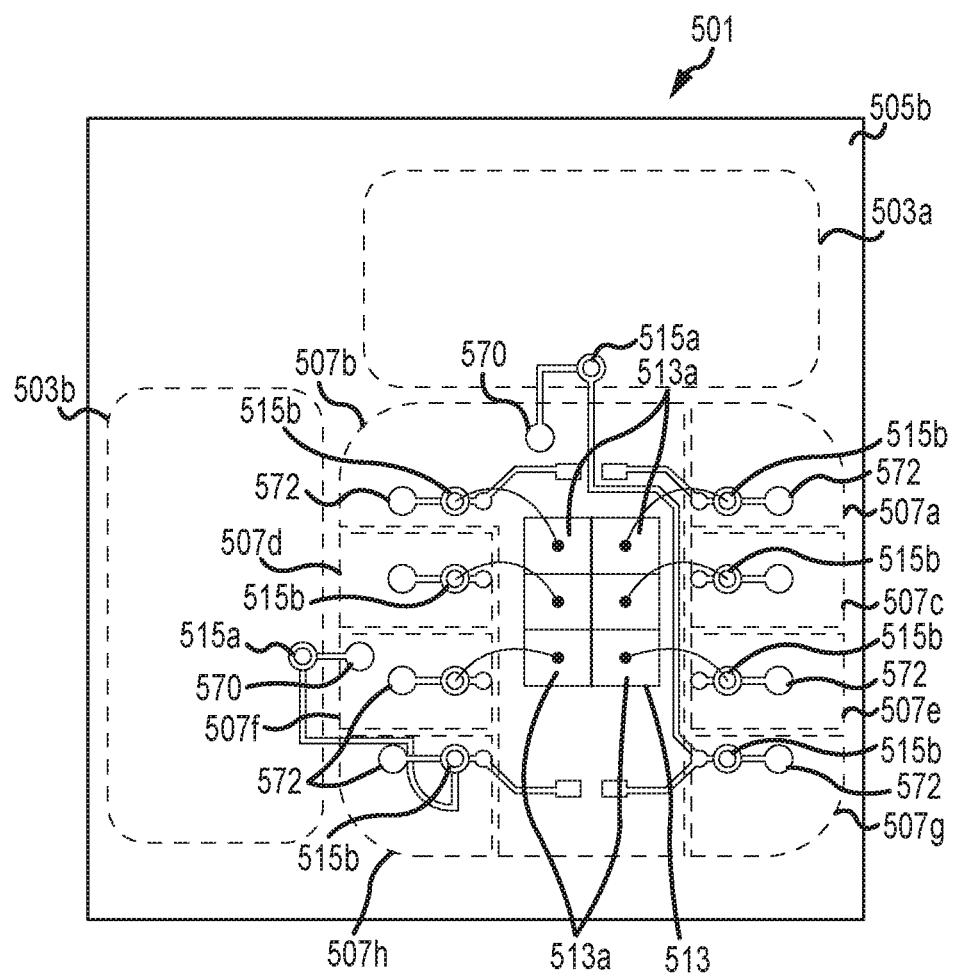

Reference is now made to FIGS. 7A and 7B which illustrate front and back views, respectively, of the integrated circuit (IC) chip module (501) shown in FIG. 6. In the embodiment shown in FIG. 7A, IC chip module (501) may include a first plurality of contact pads (503a, 503b) (e.g. electrically conductive and isolated pads such as copper pads that may be gold-plated) supportably interconnected to an outward-facing surface (505a) of a substrate (505) (e.g. an electrically non-conductive substrate such as glass, epoxy substrate) for contact engagement with at least one appendage of a user. Contact pads (503a, 503b) may function as biometric sensor pads to provide a biometric signal. Additionally, second plurality of contact pads (507a-507h) (e.g. electrically conductive and isolated pads such as copper pads that may be gold-plated) may be supportably interconnected to outward-facing surface (505a) of substrate (505), a portion of which are located for contact with a contact chip card reader to transmit/receive electrical communication signals (e.g. communication signals associated with a given payment transaction), in compliance with ISO/IEC Standard 7816-2. In that regard, the second plurality of contact pads (507a-507h) may be provided to receive electrical signals from a contact chip card reader that may comprise data communication signal and power signal components (e.g. a data communication signal component composed on a power signal component), wherein the power signal component may power componentry of the chip card (500).

As shown in FIG. 7A, contact pad (503a) may be located adjacent to a top side of the second plurality of contact pads (507a-507h), and contact pad (503b) may be located adjacent to a right side of the second plurality of contact pads (507a-507h). Such positioning of the first plurality of contact pads (503a, 503b) facilitates contact engagement by one or a pair of fingers of a user, while also maintaining adequate space on chip card (500) for the inclusion of payment account identification indicia (106), particularly when the payment account identification indicia (106) is provided in an embossed form.

As shown in FIG. 7B, IC chip module (501) may also include a first integrated circuit (IC) chip (513) supportably interconnected to an inward-facing surface (505b) of the substrate (505) and electrically interconnected to at least a portion of the second plurality of contact pads (507a-507h) for processing electrical communication signals received from/transmitted to a contact chip reader, e.g. wherein the portion of the second plurality of contact pads (507a-507h) includes at least six of contact pads (507a-507f) that are provided in compliance with ISO/IEC Standard 7816-2. In that regard, first IC chip (513) may comprise a processor for processing payment-related contact communication signals to/from a contact card reader utilizing preprogrammed instructions/algorithms and personalization data (e.g. payment account identification data corresponding with a specific payment account administered by an issuer of the corresponding chip card) stored in memory thereof, e.g. in compliance with ISO/IEC Standard 7816-2.

For purposes of illustrating electrical interconnections, FIG. 7B shows the first plurality of contact pads (503a, 503b) of FIG. 2A in phantom lines, and the second plurality of contact pads (507a-507h) of FIG. 2A in phantom lines. As shown, each of the first plurality of contact pads (503a, 503b) and each of the second plurality of contact pads (507a-507h) may be electrically interconnected through substrate (505) (e.g. via metalized vias) to corresponding electrically-conductive contacts (515a) and (515b), respectively, supportably interconnected to the inward-facing surface (505b) of substrate (505). In turn, some or all of the contacts (515b) corresponding with the second plurality of contact pads (507a-507h) may be electrically interconnected (e.g. via wire bonded interconnections) with different corresponding ones of a plurality of contact regions provided on an inward-facing side of IC chip (513). Further, each of the contacts (515a) may be electrically connected to a corresponding different one of a first plurality of conductive protrusions (570), and each of the contacts (515b) may be electrically connected to different corresponding ones of a second plurality of conductive protrusions (572). In turn, the first plurality of conductive protrusions (570) may be employed for interconnection to embedded conductive contacts and an interconnected embedded electrical component (e.g. another IC chip and/or antenna) as described above, and the second plurality of conductive protrusions (572) may be employed for interconnection to embedded conductive contacts and an interconnected embedded electrical component (e.g. another IC chip), as described hereinabove in relation to the embodiments of FIGS. 5A and 5B.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only preferred embodiment and variants thereof have been shown and described and that all changes and modifications that come within the spirit of the invention are desired to be protected.

What is claimed is:

1. A chip card comprising:
   a card body, at least a first plurality of conductive contacts that are each at least partially embedded in the card body, and an integrated circuit (IC) chip module located in a recess provided by the card body on one side of the chip card;
   wherein said IC chip module includes:
   a substrate having outward-facing and inward-facing surfaces;
   a first plurality of contact pads supportably interconnected to said outward-facing surface of the substrate for contact engagement with a contact chip card reader;
   a first IC chip supportably interconnected to the inward-facing surface of the substrate and electrically interconnected to the first plurality of contact pads for processing contact communication signals to/from a contact chip card reader; and,
   at least a first plurality of conductive protrusions supportably interconnected at corresponding first ends to the inward-facing surface of the substrate and electrically interconnected to different corresponding ones of a plurality of electrical contacts of said first IC chip, wherein corresponding, protruding second ends of said first plurality of conductive protrusions extend into a thickness of different corresponding ones of said first plurality of conductive contacts;
   wherein the chip card further comprises a second IC chip electrically interconnected to said first plurality of conductive contacts and at least partially embedded in the card body for processing a biometric signal.

2. A chip card as recited in claim 1, wherein said protruding second ends of said first plurality of conductive protrusions are each surrounded by and physically interconnected to different corresponding ones of said first plurality of conductive contacts.

3. A chip card as recited in claim 2, wherein said protruding second ends of said first plurality of conductive protrusions and said different corresponding ones of said first plurality of conductive contacts are fused together.

4. A chip card as recited in claim 1, wherein said first plurality of conductive protrusions are each defined by wire bonding at a corresponding electrical contact supportably interconnected to said inward-facing surface of the substrate.

5. A chip card as recited in claim 1, wherein said first plurality of conductive protrusions comprise at least one of:
gold;
a gold alloy;
copper;
a copper alloy;
aluminum; and,
an aluminum alloy.

6. A chip card as recited in claim 1, further comprising:
a first antenna electrically interconnected to the first plurality of conductive contacts and at least partially embedded in the card body for contactless communication with a contactless chip card reader.

7. A chip card as recited in claim 1, wherein said biometric signal is one of an electrocardiogram signal and fingerprint signal.

8. A chip card as recited in claim 1, wherein said IC chip module further comprises:
a second plurality of contact pads supportably interconnected to said outward-facing surface of the substrate for contact engagement with at least one appendage of a user for providing said biometric signal to said second IC chip for processing to authenticate a user and thereby enable said first IC chip.

9. A chip card as recited in claim 8, further comprising:
a second plurality of conductive contacts that are each at least partially embedded in the card body, and electrically interconnected to different corresponding ones of a plurality of electrical contacts of said second IC chip; and,
wherein said IC chip module further comprises:
a second plurality of conductive protrusions supportably interconnected at corresponding first ends to the inward-facing surface of the substrate and electrically interconnected to different ones of said second plurality of contact pads, wherein corresponding, protruding second ends of said second plurality of conductive protrusions extend into a thickness of different corresponding ones of said second plurality of conductive contacts.

10. A chip card as recited in claim 9, further comprising:
a third plurality of conductive contacts that are each at least partially embedded in the card body;
a first antenna electrically interconnected to the third plurality of conductive contacts and at least partially embedded in the card body for contactless communications with a contactless chip card reader; and,
wherein said IC chip module further comprises:
a third plurality of conductive protrusions supportably interconnected at corresponding first ends to the inward-facing surface of the substrate and electrically interconnected to different corresponding ones of said plurality of electrical contacts of said first IC chip, wherein corresponding, protruding second ends of said third plurality of conductive protrusions extend into a thickness of different corresponding ones of said third plurality of conductive contacts.

11. A chip card as recited in claim 10, wherein said first plurality of conductive contacts, said second plurality of conductive contacts and said first antenna are disposed on a substrate of a prelaminated member.

12. A chip card as recited in claim 1, further comprising one of the following:
a finger print sensor located in another recess provided by the card body, and electrically interconnected to said second IC chip; and,
an electrocardiogram sensor located in another recess provided by the card body, and electrically interconnected to said second IC chip.

13. A chip card as recited in claim 1, further comprising:
a biometric sensor located in another recess provided by the card body, and electrically interconnected to said second IC chip to provide said biometric signal to the second IC chip for processing to authenticate a user and thereby enable said first IC chip.

14. A chip card as recited in claim 13, further comprising:
an electrical power storage device embedded in the card body.

15. A chip card as recited in claim 13, further comprising:
a second plurality of conductive contacts that are each at least partially embedded in the card body;
a first antenna electrically interconnected to the second plurality of conductive contacts and at least partially embedded in the card body for contactless communication with a contactless chip card reader; and
a second plurality of conductive protrusions supportably interconnected at corresponding first ends to the inward-facing surface of the substrate and electrically interconnected to different corresponding ones of the plurality of electrical contacts of said first IC chip, wherein corresponding, protruding second ends of said second plurality of conductive protrusions extend into a thickness of different corresponding ones of said second plurality of conductive contacts.

16. A chip card as recited in claim 15, wherein said first plurality of conductive contacts, said second plurality of conductive contacts, said biometric sensor and said first antenna are disposed on a substrate of a prelaminated member.

17. A chip card as recited in claim 16, further comprising:
an electrical power storage device disposed on the substrate, wherein said prelaminated member is disposed between opposing core layers.

18. A chip card as recited in claim 16, wherein the first antenna has one or more loops that define a continuous electrical pathway.

19. A chip card as recited in claim 18, wherein said first antenna is disposed on a first side of the substrate, with loop start and loop end locations extended through the substrate to a second side thereof with a bridge therebetween on the second side.

20. A chip card as recited in claim 15, wherein the protruding second ends of different ones of the first plurality of conductive protrusions are fused to said different corresponding ones of said first plurality of conductive contacts, and wherein the protruding second ends of different ones of the second plurality of conductive protrusions are fused to said different corresponding ones of said second plurality of conductive contacts.

21. A method of providing a chip card, comprising:
defining a recess on one side of a card body having at least a first plurality of conductive contacts that are each at least partially embedded therein;
providing an integrated circuit (IC) chip module that includes:
a substrate having outward-facing and inward-facing surfaces;
a first plurality of contact pads supportably interconnected to said outward-facing surface of the substrate for contact engagement with a contact chip card reader;
a first IC chip supportably interconnected to the inward-facing surface of the substrate and electrically interconnected to the first plurality of contact pads for processing contact communication signals to/from a contact chip card reader; and,
at least a first plurality of conductive protrusions having corresponding first ends supportably interconnected to the inward-facing surface of the substrate and electrically interconnected to different corresponding ones of a plurality of electrical contacts of said first IC chip, wherein corresponding, protruding second ends of said first plurality of conductive protrusions protrude away from the inward-facing surface of the substrate and extend into a thickness of different corresponding ones of said first plurality of conductive contacts; and,
positioning the IC chip module within the recess of the card body, wherein during said positioning the protruding second ends of said first plurality of conductive protrusions are driven into the thickness of the different corresponding ones of said first plurality of conductive contacts, and wherein said positioning further comprises applying heat and pressure to an outward-facing surface of the IC chip module.

22. A method as recited in claim 21, wherein during said positioning said protruding second ends of said first plurality of conductive protrusions are each surrounded by and physically interconnected to said to different corresponding ones of said first plurality of conductive contacts.

23. A method as recited in claim 22, wherein during said positioning said protruding second ends of said first plurality of conductive protrusions and said different corresponding ones of said first plurality of conductive contacts are fused together.

24. A method as recited in claim 21, wherein said defining further comprises:
milling said recess to include an outer first portion having a first depth and an inner second portion having a second depth that is greater than the first depth, wherein a ring-shaped landing is defined by the card body to support said IC chip module, and wherein an adhesive is utilized in said second portion of the recess to secure the IC chip module to the card body in said positioning.

25. A method as recited in claim 24, wherein said first plurality of conductive contacts are located at said landing of said card body.

26. A method as recited in claim 21, wherein said positioning further comprises:
successively applying heat and pressure for time periods of 1.5 seconds or less to an outward-facing surface of the IC chip module.

27. A method as recited in claim 26, wherein said heat and pressure is applied to the outward-facing surface of the IC chip module at locations aligned with the first plurality of conductive protrusions.

28. A method as recited in claim 26, wherein said heat and pressure is applied to at least a portion of the first plurality of contact pads in regions substantially aligned with the first plurality of conductive protrusions.

29. A method as recited in claim 21, wherein one of a first antenna and a second IC chip is electrically interconnected to said first plurality of conductive contacts and at least partially embedded in the card body.

30. A method as recited in claim 29, wherein said card body further includes a second plurality of conductive contacts that are each at least partially embedded in the card body, wherein the IC chip module further includes a second plurality of conductive protrusions each having a corresponding first end interconnected to the inward-facing surface of the substrate and a second end protruding away from the inward-facing surface of the substrate, and wherein during said positioning the protruding second ends of said second plurality of conductive protrusions are driven into a thickness of and fused together with different corresponding ones of said second plurality of conductive contacts.

31. A method as recited in claim 30, wherein said heat and pressure is applied to at least a portion of the first plurality of contact pads in regions substantially aligned with the first plurality of conductive protrusions and with the second plurality of conductive protrusions.

32. A method as recited in claim 30, wherein the other one of a first antenna and a second IC chip is electrically interconnected to said second plurality of conductive contacts and at least partially embedded in the card body.

33. A method as recited in claim 32, wherein said card body further includes a third plurality of conductive contacts that are each at least partially embedded in the card body, and wherein the IC chip module further includes:
a second plurality of contact pads supportably interconnected to said outward-facing surface of the substrate for contact engagement with at least one appendage of a user for providing a biometric signal to said second IC chip for processing to authenticate a user and thereby enable said first IC chip; and,
a third plurality of conductive protrusions each having a corresponding first end supportably interconnected to the inward-facing surface of the substrate and electrically interconnected to different ones of said second plurality of contact pads, and each having a second end protruding away from the inward-facing surface of the substrate, wherein during said positioning the protruding second ends of said third plurality of conductive protrusions are driven into a thickness of and fused together with different corresponding ones of said third plurality of conductive contacts.

34. A method as recited in claim 32, wherein a biometric sensor is located in another recess provided by the card body and electrically interconnected to said second IC chip to provide said biometric signal to the second IC chip for processing to authenticate a user and thereby enable said first IC chip.

35. A method of providing a chip card, comprising:
defining a recess on one side of a card body having at least a first plurality of conductive contacts that are each at least partially embedded therein, wherein said defining comprises milling said recess to include an outer first portion having a first depth and an inner second portion having a second depth that is greater than the first depth, wherein a ring-shaped landing is defined by the card body;

providing an integrated circuit (IC) chip module that includes:
- a substrate having outward-facing and inward-facing surfaces;
- a first plurality of contact pads supportably interconnected to said outward-facing surface of the substrate for contact engagement with a contact chip card reader;
- a first IC chip supportably interconnected to the inward-facing surface of the substrate and electrically interconnected to the first plurality of contact pads for processing contact communication signals to/from a contact chip card reader; and,
- at least a first plurality of conductive protrusions having corresponding first ends supportably interconnected to the inward-facing surface of the substrate and electrically interconnected to different corresponding ones of a plurality of electrical contacts of said first IC chip, wherein corresponding, protruding second ends of said first plurality of conductive protrusions protrude away from the inward-facing surface of the substrate and extend into a thickness of different corresponding ones of said first plurality of conductive contacts; and, positioning the IC chip module within the recess of the card body so that the IC chip module is supported by the ring-shaped landing, wherein an adhesive is utilized in said second portion of the recess to secure the IC chip module to the card body in said positioning, and wherein during said positioning the protruding second ends of said first plurality of conductive protrusions are driven into the thickness of the different corresponding ones of said first plurality of conductive contacts.

36. A method as recited in claim 35, wherein said first plurality of conductive contacts are located at said landing of said card body.

* * * * *